United States Patent [19]

Kubota et al.

[11] Patent Number: 4,749,237

[45] Date of Patent: Jun. 7, 1988

[54] HYDRAULIC CYLINDER WITH CONTROL VALVE

[75] Inventors: Hitoshi Kubota, Minamiashigara; Teluo Yambe; Akira Ishii, both of Yokosuka, all of Japan

[73] Assignees: Nissan Motor Company, Limited, Yokohama; Nippon Air Brake Company, Kobe, both of Japan

[21] Appl. No.: 96,235

[22] Filed: Sep. 8, 1987

Related U.S. Application Data

[63] Continuation of Ser. No. 736,960, May 22, 1985, abandoned.

[30] Foreign Application Priority Data

May 23, 1984 [JP] Japan .............................. 59-76271[U]

[51] Int. Cl.⁴ .............................................. B60T 11/20
[52] U.S. Cl. ...................................... 303/9.62; 60/591; 303/9.72; 303/9.69
[58] Field of Search ...................... 303/6 R, 6 C, 22 R; 60/591

[56] References Cited

U.S. PATENT DOCUMENTS

| 3,838,887 | 10/1974 | Stelzer | 303/6 C |
| 4,024,712 | 5/1977 | Takeuchi | 60/591 |
| 4,356,694 | 11/1982 | Koshimizu et al. | 60/591 |

FOREIGN PATENT DOCUMENTS 56-63539  5/1981  Japan .
56-71647  6/1981  Japan .

*Primary Examiner*—Duane A. Reger
*Assistant Examiner*—Matthew C. Graham
*Attorney, Agent, or Firm*—Schwartz, Jeffery, Schwaab, Mack, Blumenthal & Evans

[57] ABSTRACT

An inventive hydraulic cylinder with a control valve is compact and easy to assemble. The cylinder has a cylinder body including a working chamber and a valve sleeve bore, a valve casing fitting into the valve sleeve bore and consisting of a first valve casing member and a second valve casing member, both valve casing members being inserted into the valve sleeve bore and defining a control chamber, a sealer for one end of the valve sleeve bore separated from the second valve casing member, the sealer and the second valve casing member defining an intermediate chamber connected to both the working chamber and the control chamber.

7 Claims, 3 Drawing Sheets

HYDRAULIC CYLINDER WITH CONTROL VALVE

This application is a continuation of application Ser. No. 736,960, filed May 22, 1985, now abandoned.

BACKGROUND OF THE INVENTION

1. Field of the Invention

This invention relates to a hydraulic cylinder with a control valve and more particularly to an automotive brake master cylinder with a proportioning valve.

2. Description of the Prior Art

No. JP-A-5671647 shows a prior art proportioning value for automotive brakes. In this valve, a thick-walled valve sleeve and two plugs pressed into the opposite open ends of the valve sleeve make up a valve casing. A snap ring fixed to the wall of the valve sleeve engages the outer edge of each plug. Since hydraulic brake pressure within the chamber defined by the combination of the valve sleeve, one of the plugs and a valve stem within the valve casing may reach to about 0.0981 Pa (100 kgf/cm$^2$), the thickness of the walls of the valve sleeve and considerable care in retaining the plugs are inevitable in order to withstand the brake fluid pressure within the chamber.

Accordingly, if this prior art proportioning valve were to be built into a cylinder body of an automotive brake master cylinder, the master cylinder would necessarily have to be quite large and inserting the plugs into the cylinder body would be very difficult.

No. JP-A-5663539 also shows a similar prior art proportioning valve for automotive brakes.

SUMMARY OF THE INVENTION

An object of this invention is to provide a compact hydraulic cylinder with a control valve which facilitates assembly. In order to achieve this object, a hydraulic cylinder with a control valve comprises a cylinder body including a working chamber and a valve sleeve bore, a valve casing fitted into the valve sleeve bore and consisting of a first valve casing member and a second valve casing member, both fitting into the valve sleeve bore and defining a control chamber, a sealer for one end of the valve sleeve bore separated from the second valve casing member, the sealer and the second valve casing member defining an intermediate chamber connected to both the working chamber and the control chamber.

This invention obviates the need for pressing the valve cylinder into the valve sleeve bore.

DESCRIPTION OF THE PREFERRED EMBODIMENT

The preferred embodiment of this invention will be described below with reference to FIGS. 1 to 3.

Figure 1:
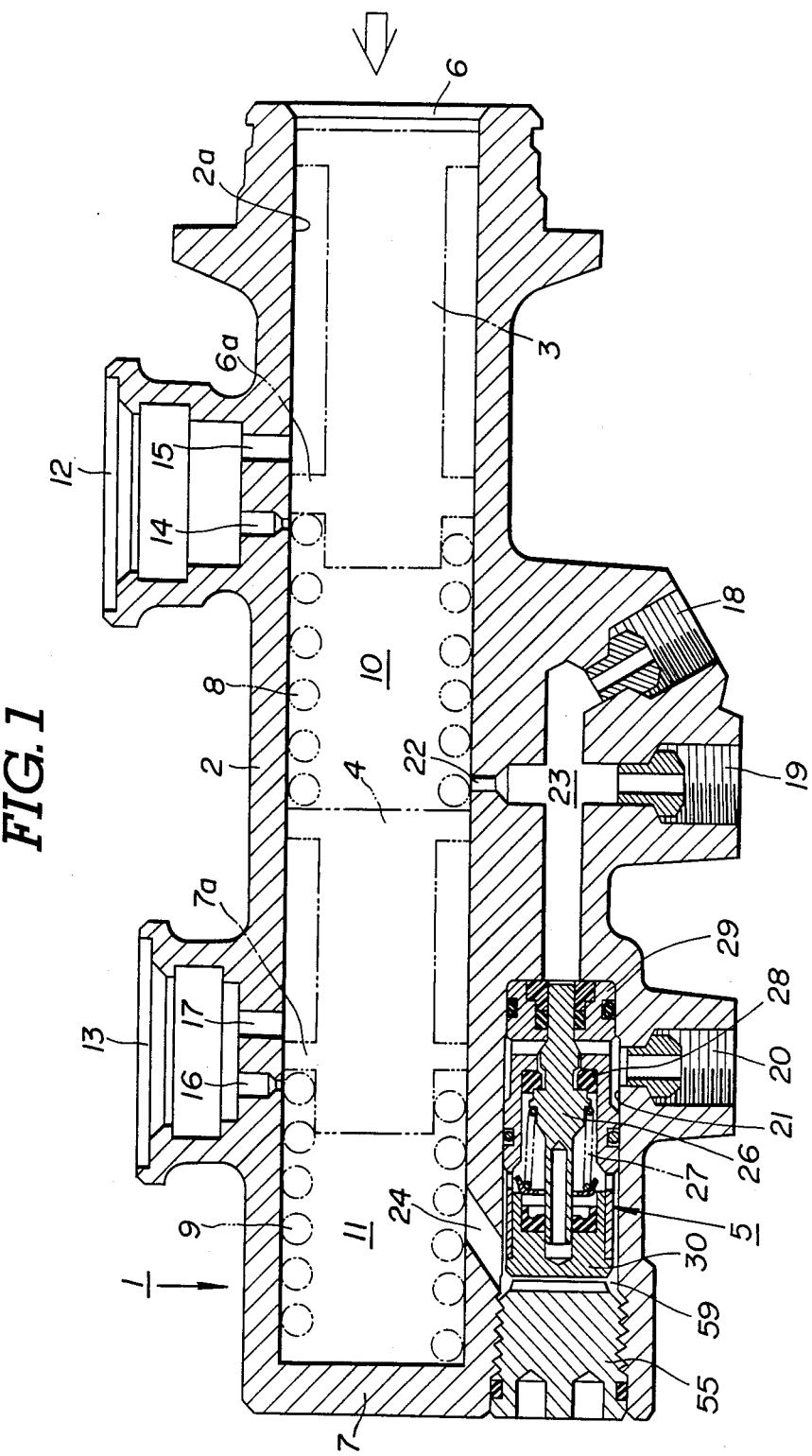
FIG. 1 is a longitudinal section through an automotive brake master cylinder with a proportioning valve according to this invention.

As shown in FIG. 1, an automotive brake tandem master cylinder 1 comprises a master cylinder body 2, a primary piston 3 shown in phantom lines, a secondary piston 4 also shown in phantom lines and a proportioning valve 5.

The master cylinder body 2 has an open end 6 on its primary piston side and a sealed end wall 7 on its secondary piston side. The secondary piston 4 is supported by opposing seated compression return springs 8 and 9. The return spring 8 is seated between the primary and secondary pistons 3 and 4 and the compression return spring 9 is seated between the secondary piston 4 and the end wall 7 of the master cylinder body 2. The primary and secondary pistons 3 and 4 define a primary pressure chamber 10 and the secondary piston 4 and the end wall 7 of the master cylinder body 2 define a secondary pressure chamber 11 within the master cylinder body 2. The primary piston 3 is linked to a brake pedal (not shown).

The cylindrical wall of the master cylinder body 2 has a primary brake fluid inlet 12 hydraulically connected to the primary pressure chamber 10 and a secondary brake fluid inlet 13 hydraulically connected to the secondary pressure chamber 11. The primary and secondary brake fluid inlets 12 and 13 connect to separate brake fluid reservoir tanks (not shown). The primary brake fluid inlet 12 has a first relief port 14 with a restriction orifice and a second relief port 15 with a relatively large cross-section, both opening into the master cylinder bore 2a. When the primary piston 3 is in its rest position shown in FIG. 1, the first relief port 14 opens into the primary pressure chamber 10 while the second relief port 15 is disconnected from the primary pressure chamber 10. The secondary brake fluid inlet 13 has a third relief port 16 similar to the first relief port 14, and a fourth relief port 17 similar to the second relief port 15.

The cylindrical walls of the master cylinder body 2 also support two front-brake fluid outlets 18 and 19, a rear-brake fluid outlet 20 and a proportioning valve sleeve bore 21. The front-brake fluid outlets 18 and 19 are both connect to the primary pressure chamber 10 via a primary passage orifice 22 and are connected to the valve sleeve bore 21 by way of a passageway 23. The front-brake fluid outlets 18 and 19 also are connected separately to front wheel cylinders (not shown). The rear-brake fluid outlet 20 is connected by way of the valve sleeve bore 21 to a secondary passage 24 opening into the secondary pressure chamber 11. The rear-brake fluid outlet 20 is also connected to a rear wheel cylinder (not shown). The axis of the valve sleeve bore 21 is parallel to the axis of the master cylinder bore 2a.

Figure 2:
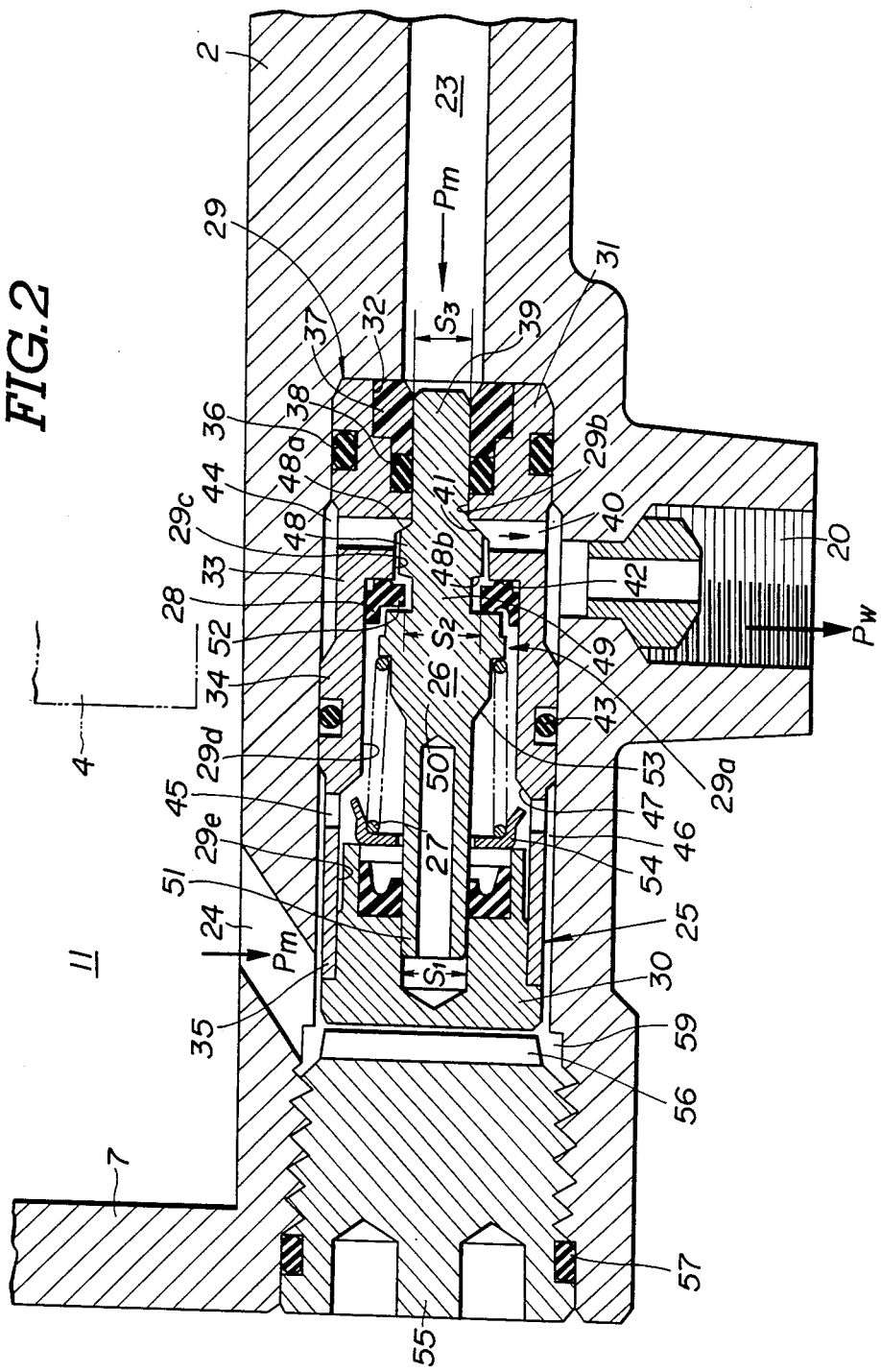
FIG. 2 is an enlargement of part of FIG. 1.

As best shown in FIG. 2, the proportioning valve 5 comprises a proportioning valve casing 25 inserted into the valve sleeve bore 21, a valve stem 26 within the valve casing 25, a compression return spring 27 biasing the valve stem 26, and an annular lip seal 28 made of elastic material.

The valve casing 25 consists of a valve cylinder body 29 and a plug 30 inserted into one open end of the valve cylinder body 29. The valve cylinder body 29 includes an enlarged and thickened end wall 31 with a three-step central bore 32, a first reduced-outer-diameter portion 33 adjoining the enlarged and thickened end wall 31, a central enlarged-outer-diameter portion 34 adjoining the first reduced-outer-diameter portion 33, and a second reduced-outer-diameter portion 35 adjoining the central enlarged-outer-diameter portion 34, the outer diameter of the second reduced-outer-diameter portion 35 being larger than that of the first reduced-outer-diameter portion 33.

The cylindrical bore 29a of the valve cylinder body 29 subdivided from the enlarged end 31 to the second reduced portion 35 into first, second, third and fourth bore sections 29b, 29c, 29d and 29e. The diameter of the second bore section 29c is larger than that of the first bore section 29b. The diameter of the third bore section 29d is larger than that of the second bore section 29c. The diameter of the fourth bore section 29e is larger than that of the third bore section 29d.

The outer cylindrical surface of the valve cylinder end wall 31 fits fluid-tight within the inner surface of the valve sleeve bore 21 by means of an O-ring 36. An annular member 37 made of elastic material fits onto two of the stepped surface of the central bore 32 and an O-ring 38 fits into the remaining space of the central surface of the central bore 32. A cylindrical bore defined by the end wall 31, the O-ring 38 and the annular member 37 accommodates an end stem 39 of the valve stem 26. One end of the central bore 32 is exposed to the two front brake fluid outlets 18 and 19 by the passageway 23.

The first reduced-outer-diameter portion 33 is pierced by a plurality of radially extending holes 40. The inner surface of the first reduced-outer-diameter portion 33 forms a tapered shoulder 41 between the first bore section 29b and the second bore section 29c. The tapered shoulder 41 overlaps the inner ends of the radially extending holes 40. The inner surface of the first reduced-outer-diameter portion 33 also forms a flat shoulder 42 between the second bore section 29c and the third bore section 29d.

The outer cylindrical surface of the central enlarged outer-diameter portion 34 form a fluid-tight seal with the valve sleeve bore 21 by means of an O-ring 43. The inner surfaces of the first reduced-outer-diameter portion 33 and the central enlarged-outer-diameter portion 34 form the third bore section 29d. An annular chamber 44 is defined by the outer surface of the first reduced-outer-diameter portion 33 and the valve sleeve bore 21.

The second reduced-outer-diameter portion 35 is pierced axially by the fourth bore section 29e and radially by a plurality of radially extending holes 45. An annular chamber 46 is defined between the outer surface of the second reduced-outer-diameter portion 35 and the valve sleeve bore 21. A tapered shoulder 47 joins the third and fourth bore sections 29d and 29e. The plug 30 fits into the open end of the fourth bore section 29e as previously stated.

The valve stem 26 comprises the end step 39, a first enlarged stem 48 adjoining the end stem 39, an intermediate stem 49 adjoining the first enlarged stem 48, a second enlarged stem 50 adjoining the intermediate stem 49, and a second end reduced stem 51 adjoining the second enlarged stem 50.

The first end stem 39 slides axially along the inner surfaces of the first bore section 29b, the O-ring 38 and the annular member 37. The first enlarged stem 48 has shoulders 48a and 48b at either axial end. The shoulder 48a is tapered and the taper of the shoulder 48a matches that of the shoulder 41 in the valve cylinder bore 29a. The shoulder 48b is slightly tapered, i.e., is almost sheer. Alternatively, the shoulders 48a and 48b may be flat. The diameter of the first enlarged stem 48 is smaller than that of the second bore section 29c, as shown in FIG. 2, so that the inner surface of the second bore portion 29c and the outer surface of the first enlarged stem define an annular gap.

The second enlarged stem 50 has a flat shoulder 52 adjoining the second reduced stem 49 at one end and a spring-seating shoulder 53 at its other end.

The second end stem 51 is in the form of a hollow cylinder forming a blind bore.

The return spring 27 is seated between the spring-seating shoulder 53 and a cup-shaped spring retainer 54 abutting the inner face of the plug 30.

The outer end of the valve sleeve bore 21 is threaded and a valve sleeve plug 55 is screwed into this outer end. The inner face of the valve sleeve plug 55 has a groove 56 for working fluid and directly opposes the outer face of the valve cylinder plug 30. The valve sleeve bore 21 is sealed by an O-ring 57 retained in a groove in the outer cylindrical surface of the valve sleeve plug 55. The valve sleeve plug 55 retains the valve cylinder plug 30 within the valve cylinder 29.

The annular lip seal 28 surrounds the second reduced stem 49 within the third bore section 29d. The outer cylindrical surface of the lip seal 28 slides along the inner surface of the third bore section 29d. The inner diameter of the lip seal 28 is noticeably larger than the diameter of the second reduced stem 49 but smaller than the outer diameter of the shoulder 52. An annular projection on one face of the lip seal 28 rests in contact with the shoulder 42. An annular projection with a semicircular cross-section on the other face of the lip seal 28 rests in contact with the shoulder 42. The contact between the annular projection and the shoulder 52 is not fluid-tight, but rather allows passage of brake fluid since the abutment of the tapered shoulder 48a of the valve stem 26 on the tapered shoulder 41 of the valve cylinder 29 prevents excessive axial compression of the lip seal 28.

The inner diameter of the central aperture in the lip seal 28 is larger than an outer diameter of the second end stem 51 which is in turn larger than the outer diameter of the first end stem 39.

An operation of the inventive master cylinder is described below.

When a driver operates the brake pedal during normal braking, the primary and secondary pistons 3 and 4 move to the left in FIG. 1. After the respective lands 6a and 7a of the primary and secondary pistons 3 and 4 move to the left past the first relief ports 14 and 16, the brake fluid pressures $P_m$ in the primary and secondary pressure chambers 10 and 11 start to increase. The increased brake fluid pressure $P_m$ in the primary pressure chamber 10 is applied to the front wheel-cylinders via the primary passage 22, the passageway 23 and the front-brake fluid outlets 18 and 19. The increased brake fluid pressure $P_m$ in the secondary pressure chamber 11 is applied to the rear wheel-cylinders via the passage 24, the annular chamber 46, the holes 45, the fourth bore section 29e, the third bore section 29d, the interstices between the shoulder 52 and the lip seal 28, the gap between the inner cylindrical surface of the lip seal 28 and the second reduced stem portion 49, the gap between the inner surface of the second bore section 29c and the outer surface of the first enlarged stem portion 48, the radially extending holes 40, and the rear-brake fluid outlet 20.

During breaking operation, the brake fluid pressure Pm in the primary and secondary pressure chambers 10 and 11 increases according to increasing of magnitude of depression of a brake pedal (not shown).

While brake fluid pressure Pm is lower that a predetermined split point, the spring pressure F of the return spring 27 overcomes the fluid pressure exterted against the biasing force of the spring to maintain the valve stem 26 in a position of FIG. 2. At this position, the shoulder of the second enlarged stem 50 opposing the shoulder of the lip seal 28 seats the latter to define a clearance through which the brake fluid in the third bore section 29d flows. Therefore, the fluid pressure Pw at the rear-brake fluid outlet 20 remains approximately equal to the brake fluid pressure Pm in the secondary pressure chamber 11.

Here, the split point of the brake fluid pressure is determined by the spring pressure F of the return spring 27. The return spring 27 constantly biases a piston toward right in FIG. 2. Fluid force against the spring force of the return spring 27 is applied on the first end stem 39 which has sectional area $S_3$ and imaginary annular area ($S_1-S_3$) which is difference of sectional area $S_1$ of the second end stem 51 and the sectional area $S_3$ of the first end stem 39. Therefore, the fluid force applied to the piston 29 at the condition of FIG. 2 can be illustrated as follows:

$$S_3 \cdot Pm + (S_1 - S_3) \cdot Pm = F \tag{1}$$

Therefore, the equibrium of the fluid pressure Pm and the spring force F of the return spring 27 at the split point is illustrated by $$Pm = F \cdot S_1 \tag{2}$$

Since the fluid pressure Pm in the secondary pressure chamber 11 increases at the same rate of increasing of the fluid pressure in the primary chamber 10 which is in communication with the front wheel cylinders, the rear braking pressure at this condition is maintained at substantially same as the front braking pressure.

When the brake fluid pressure Pm in the primary and secondary pressure chamber increases beyond the split point, the fluid pressure exerted on the piston overcomes the spring pressure F of the return spring 27 to shift the piston toward left in FIG. 2. As a result, the shoulder 48b of the valve stem 26 abuts against the corresponding shoulder of the lip seal 28. Contact of the shoulder 48b to lip seal 28 establish fluid blocking therebetween. Therefore, the rear-brake fluid outlet 20 is disconnected from the third bore section 29d. Immediate after this, the fluid force in the third bore section and the spring force overcomes the fluid force applied biasing the piston leftwardly to shift the position 26 into the position of FIG. 2 to establish fluid communication between the third bore section 29d and the rear-brake fluid output 20.

At this state where the shoulder 48b of the valve stem 26 abuts the corresponding shoulder of the lip seal 28, the following equations can be established.

$$F_r = Pm(S_2 - S_1) + F \tag{3}$$

$$F_\lambda = Pw(S_2 - S_3) + Pm \cdot S_3 \tag{4}$$

$$Pw = \frac{(S_2 - (S_1 + S_3)) \cdot PM}{S_2 - S_3} + \frac{F}{S_2 - S_3} \tag{5}$$

where
$F_r$ is rightward force applied to the valve stem 26; and
$F_\lambda$ is leftward force applied to the valve stem 26.

By blocking fluid communication between the third bore section, the rightward force $F_r$ again become greater than the leftward force $F_\lambda$ to shift the valve stem 26 toward right as set forth above. On the other hand, by establishing fluid communication between the third bore section 29d and the rear-brake fluid outlet 20, the leftward force overcomes the rightward force to shift the valve stem 26 toward left to block fluid communication between the third bore section 29d and the rear-brake outlet 20.

Therefore, as will be appreciated, the valve stem 26 vibrates between the leftwardly shifted position where the fluid communication between the third bore section 29d and the rear-brake fluid outlet 20 is blocked and the rightwardly shifted position of FIG. 2. Thus increasing rate of the fluid pressure Pw at the rear-brake fluid outlet 20 becomes lower than increasing rate of the fluid pressure at the front-brake fluid outlets 18 and 19, which, in turn, corresponds to the increasing rate of the fluid pressure Pm, as shown in FIG. 3.

When the front brake system is damped or fails, the brake fluid pressure Pm in the primary fluid chamber 10 becomes zero. At this condition, when the brake fluid pressure Pm in the secondary fluid pressure chamber 11 is smaller than that required for overcoming the spring force F of the return spring 27, the leftward force to be applied to the valve stem 26 can be illustrated by:

$$F = (S_1 - S_3) \cdot Pm \tag{6}$$

Figure 3:
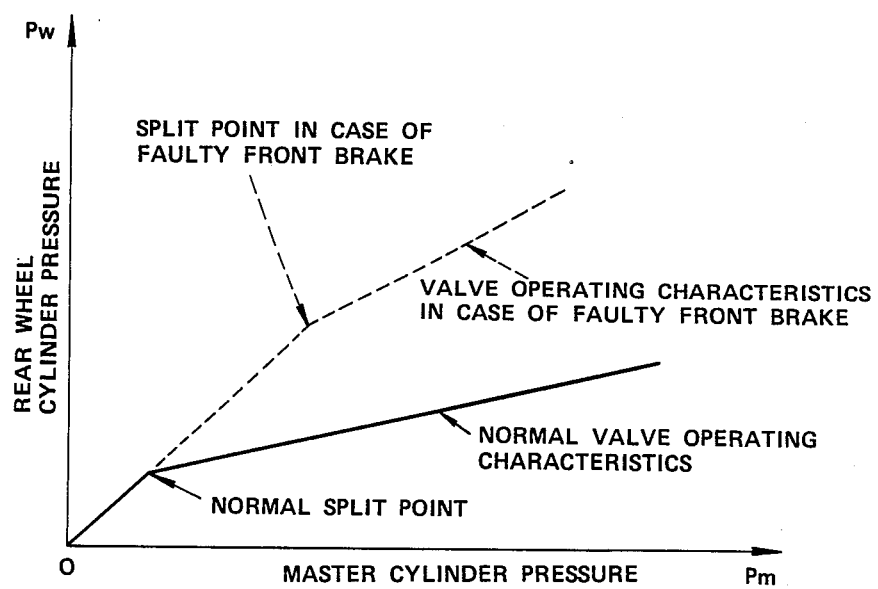
FIG. 3 is a graph showing the operating characteristics of the proportioning valve shown in FIG. 1.

As will be appreciated herefrom, in this case, the split point is raised up as illustrated by broken line in FIG. 3.

By further depressing the brake pedal, the brake fluid pressure Pm in the secondary fluid chamber 11 increases across the split point, then the valve stem 26 starts to vibrate between leftwardly shifted position and rightwardly shifted position. At this time the fluid pressure Pw at the rear-brake fluid outlet 20 can be illustrated by:

$$Pw = \frac{S_2 - S_1}{S_2 - S_3} \cdot Pm + \frac{1}{S_2 - S_3} \cdot F \tag{7}$$

Therefore, as will be seen from FIG. 3, when the front brake systaem fails, the split point for the rear brake system goes higher and increasing rate of the brake fluid pressure for the rear brake system after the fluid pressure Pm in the secondaray pressure chamber 11 exceeds the split point become higher than that in the normal state.

Since the fourth bore section 29e is hydraulically connected to the interior of the chamber 59 defined by the threaded valve sleeve plug 55, the master cylinder body 2, the valve cylinder plug 30 and the second reduced outer-diameter portion 35, the force on the valve cylinder plug 30 in the direction of expulsion from the valve cylinder 29 is not affected by changes in brake fluid pressure even though the pressure $P_m$ in the secondary pressure chamber 11 may increase to as high as about 0.0981 Pa. The threaded engagement between the valve sleeve plug 55 and the walls of the valve sleeve bore 21 in the master cylinder body 2 can withstand the highest possible pressure developed in the chamber 59. Inserting the valve cylinder plug 30 into the valve cylinder 25 requires only overcoming the set force of the return spring 27.

This invention obviates the needs for the a press fit between the entire outer cylindrical surface of the valve cylinder body 29 and the inner surface of the valve sleeve bore 21 and for snap rings retaining the valve cylinder plug 30. This invention also obviates the needs for a thick-walled master cylinder body and valve cylinder.

The brake master cylinder according to this embodiment facilitates assembly and reduces the overall bulk of the finished master cylinder.

In another embodiment, a valve cylinder plug may surround the outer cylindrical surface of the second reduced-outer-diameter portion 35.

What is claimed is:

1. A master cylinder for a brake system including a hydraulic circuit, comprising:
    a hollow cylinder defining therein an axially extending cylinder bore and an outlet port in communication with said hydraulic circuit;
    a piston disposed within said cylinder bore and defining a pressure chamber for building up braking pressure therein;
    means for defining follow space with an open end, said follow space being in communication with said pressure chamber and said outlet port via first and second fluid passages;
    an end plug sealingly engaging said open end for closing said follow space;
    a pressure control valve disposed within said follow space and defining first and second chambers within said follow space, said pressure control valve being responsive to said braking pressure in said pressure chamber exceeding a given set pressure for vibrating between a first position in which it establishes fluid communication between said pressure chamber and said outlet port through said first and second chambers, and a second position in which it blocks fluid communication between said pressure chamber and said outlet port, for proportioning operation;
    a valve casing constituting part of said pressure control valve and including a first valve casing member and a second valve casing member both fixed within said follow space, the first valve casing member being hollow and having an opening opposed to an inner end face of the end plug at a spaced interval, the second valve casing member sealing the opening and being subject to continuously equal fluid pressures acting in opposite directions to each other from said first and second chambers;
    a fluid passage for equalizing the fluid pressures in said first and second chambers.

2. A master cylinder as recited in claim 1, wherein the first valve casing member comprises a valve cylinder body and the second valve casing member comprises a valve cylinder plug inserted into an open end of the valve cylinder body.

3. A master cylinder as recited in claim 1, wherein the first valve casing member comprises a valve cylinder body, the valve cylinder body comprising a first reduced-outer-diameter portion, a second reduced-outer-diameter portion and an enlarged-outer-diameter portion between the first and second reduced-outer-diameter portions, the outer surface of the enlarged-outer-diameter portion fitting within the inner surface of the follow space.

4. A master cylinder as recited in claim 1, wherein the inner surface of the open end of the follow space is threaded, said end plug being screwed into the open end of the follow space.

5. A master cylinder as recited in claim 4, wherein an inner face of said end plug includes a groove for working fluid.

6. A master cylinder as recited in claim 1, wherein the pressure control valve includes a spring means for returning the pressure control valve from the second position to the first position, a force of the spring means loading on the valve cylinder plug in the same direction as the fluid pressure in the first chamber.

7. An automotive brake master cylinder with a proportioning valve, comprising:
    a cylinder body including a master cylinder bore and a valve sleeve bore;
    an end wall sealing one end of the master cylinder bore;
    a working piston with the master cylinder bore, said end wall and said working piston defining a working chamber capable of being connected to a rear-brake fluid outlet;
    a valve casing of the proportioning valve disposed within the valve sleeve bore and comprising a valve cylinder body and a valve cylinder plug inserted into and sealing an open end of the valve cylinder body, both the valve cylinder body and the valve cylinder plug being disposed fixedly within the valve sleeve bore;
    a valve seat disposed within the valve casing;
    a valve stem disposed within the valve casing and cooperating with said valve seat,; and
    means, facing and separated from the valve cylinder plug, for sealing one end of the valve sleeve bore, said sealing means and the valve cylinder plug defining an intermediate chamber; and
    wherein the valve cylinder body, the valve cylinder plug, said valve seat and said valve stem define a control chamber connected to the rear-brake fluid outlet; and
    wherein the working chamber, the control chamber and the intermediate chamber are mutually interconnected;
    and wherein the valve cylinder plug is subject to continuously equal fluid pressures acting in opposite directions to each other from the control chamber and the intermediate chamber.

* * * * *